United States Patent [19]
Baker et al.

[11] 3,998,412
[45] Dec. 21, 1976

[54] HELICAL VERTICAL PATH CONTROL APPARATUS FOR AIRCRAFT AREA NAVIGATION SYSTEM

[75] Inventors: Donald H. Baker; Larry J. Bowe, both of Phoenix; William C. Post, Scottsdale, all of Ariz.

[73] Assignee: Sperry Rand Corporation, New York, N.Y.

[22] Filed: May 29, 1975

[21] Appl. No.: 581,988

[52] U.S. Cl. .......................... 244/189; 235/150.27; 343/7 ED
[51] Int. Cl.² .................................... B64C 13/20
[58] Field of Search ................. 235/150.22, 150.26, 235/150.27; 244/77 A, 77 B, 77 D, 180, 183–187, 189; 343/6 R, 6 DF, 7 ED, 107, 112 C

[56] References Cited
UNITED STATES PATENTS

| | | | |
|---|---|---|---|
| 3,691,361 | 9/1972 | Perkins | 235/150.27 |
| 3,705,306 | 12/1972 | Lydon et al. | 235/150.26 X |
| 3,786,505 | 1/1974 | Rennie | 235/150.27 X |

Primary Examiner—Stephen G. Kunin
Attorney, Agent, or Firm—Howard P. Terry; Albert B. Cooper

[57] ABSTRACT

Control apparatus for an aircraft area navigation system provides a vertical path control signal to cause the aircraft to ascend or descend along a helical surface as the craft executes a transition laterally from the inbound course to the outbound course of a waypoint whereby the craft attains the waypoint altitude when crossing the course bisector thereof while maintaining a predetermined vertical flight path angle when steered on a predetermined lateral course transition path.

16 Claims, 9 Drawing Figures

HELICAL VERTICAL PATH CONTROL APPARATUS FOR AIRCRAFT AREA NAVIGATION SYSTEM

BACKGROUND OF THE INVENTION

1. Field of the Invention

The invention generally relates to aircraft area navigation systems (RNAV), particularly with regard to the vertical path control thereof when effecting lateral transitions with regard to the waypoints of the flight plan.

2. Description of the Prior Art

Aircraft area navigation systems are known in the prior art that provide guidance both laterally and vertically to a point in space called a waypoint. The waypoint is defined laterally by latitude and longitude or by range and bearing from a radio navigation aide such as a VORTAC station and the aircraft is considered to be at the waypoint laterally when it crosses the line that bisects the inbound and outbound courses of the waypoint as the craft effects a transition between these courses. The waypoint is also defined by an altitude whereat the aircraft is often required to be when it crosses the waypoint inbound and outbound course bisector.

In these prior art RNAV systems the desired altitude has been computed as a function of the vertical flight path angle and the along track distance to the wayline of the waypoint, which is a line at the waypoint which is perpendicular to the inbound track. This procedure has the effect of generating a plane surface on which the aircraft ascends or descends. Flying the vertical path in a plane along the straight line inbound course of a waypoint has been satisfactory in the prior art systems. However, when the aircraft executes a transition from the inbound course to the outbound course while flying the planar vertical path, the craft must fly across the plane thus not maintaining the specified vertical angle. This results in the aircraft not being at the waypoint altitude when it reaches the bisector of the courses which is the point at which the new leg is defined to begin, resulting in an altitude discontinuity in the desired vertical path when the RNAV system begins generating the vertical control signals for the new leg. Additionally, the change in vertical flight path angle when effecting the lateral course transition is undesirable from the viewpoint of smooth continuous piloting techniques. Thus it is appreciated that a significant altitude discontinuity occurs when the system switches to perform the vertical navigation associated with the outbound lateral path of the waypoint, which discontinuity may be large enough to cause an abrupt and undesirable command by the automatic flight control system connected to the vertical navigation output. In the prior art systems when the pilot attempted to execute a lateral course transition turn simultaneously while endeavoring to fly the vertical path, because of the above described deficiency, it was often impossible for the aircraft to attain the required waypoint altitude. Under such conditions the aircraft pilot was often compelled to disengage the vertical navigation system and manually control the craft to assure that the waypoint altitude would be attained.

SUMMARY OF THE INVENTION

The invention provides smooth and continuous vertical guidance while a lateral course transition is being commanded whereby the waypoint altitude is attained at the bisector of the inbound and outbound courses irrespective of the lateral path flown. For a predetermined lateral path the vertical flight path angle along the transition path is maintained the same as that along the inbound course to the waypoint.

These advantages and others are achieved by providing apparatus to control the aircraft to fly the vertical path in a helix when executing a transitioning from the inbound to the outbound courses of the waypoint.

DESCRIPTION OF THE PREFERRED EMBODIMENTS

Figure 1:
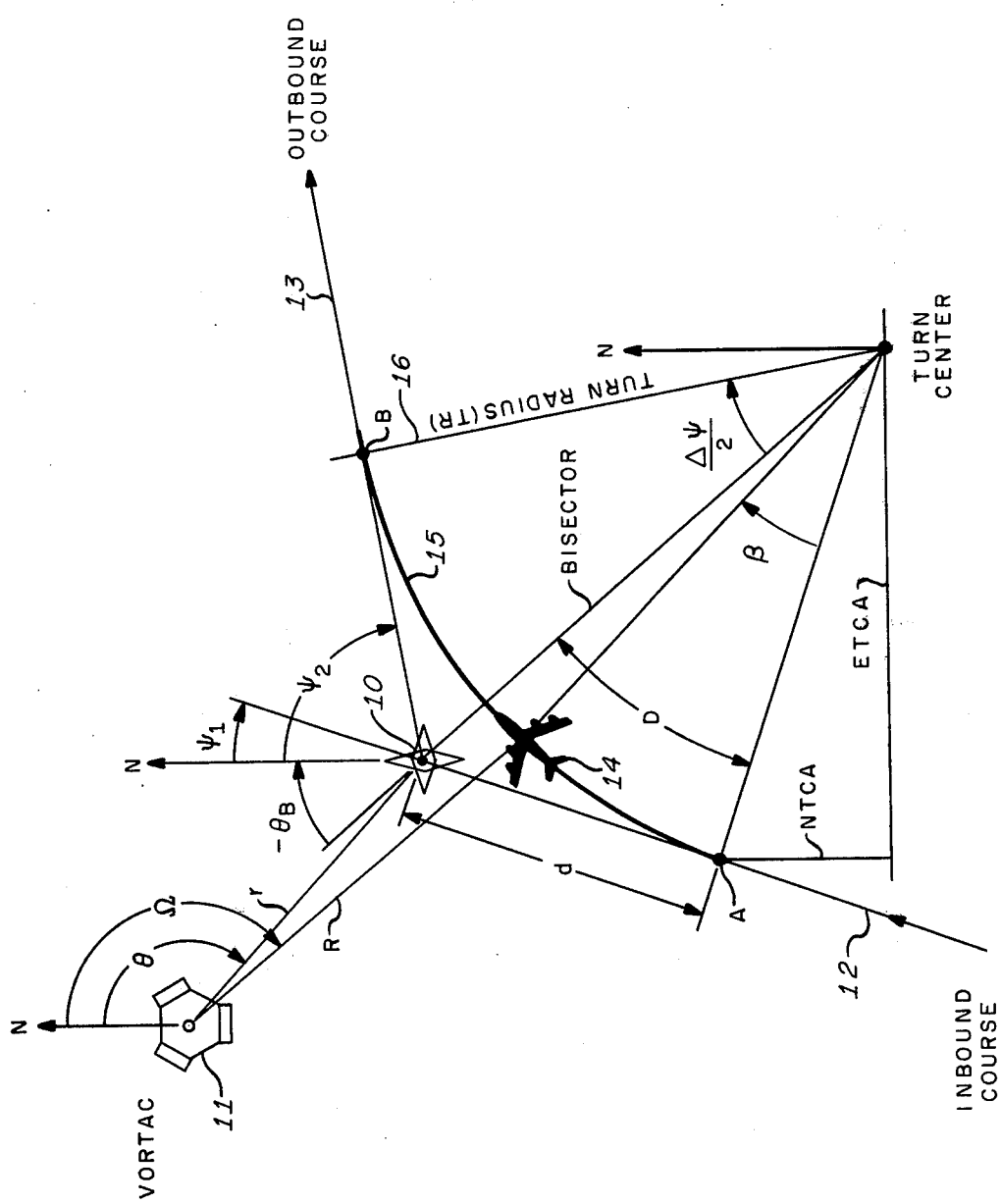
FIG. 1 is a diagram illustrating geometrical parameters with regard to a lateral transition path from an inbound course to an outbound course at a waypoint.
Figure 2:
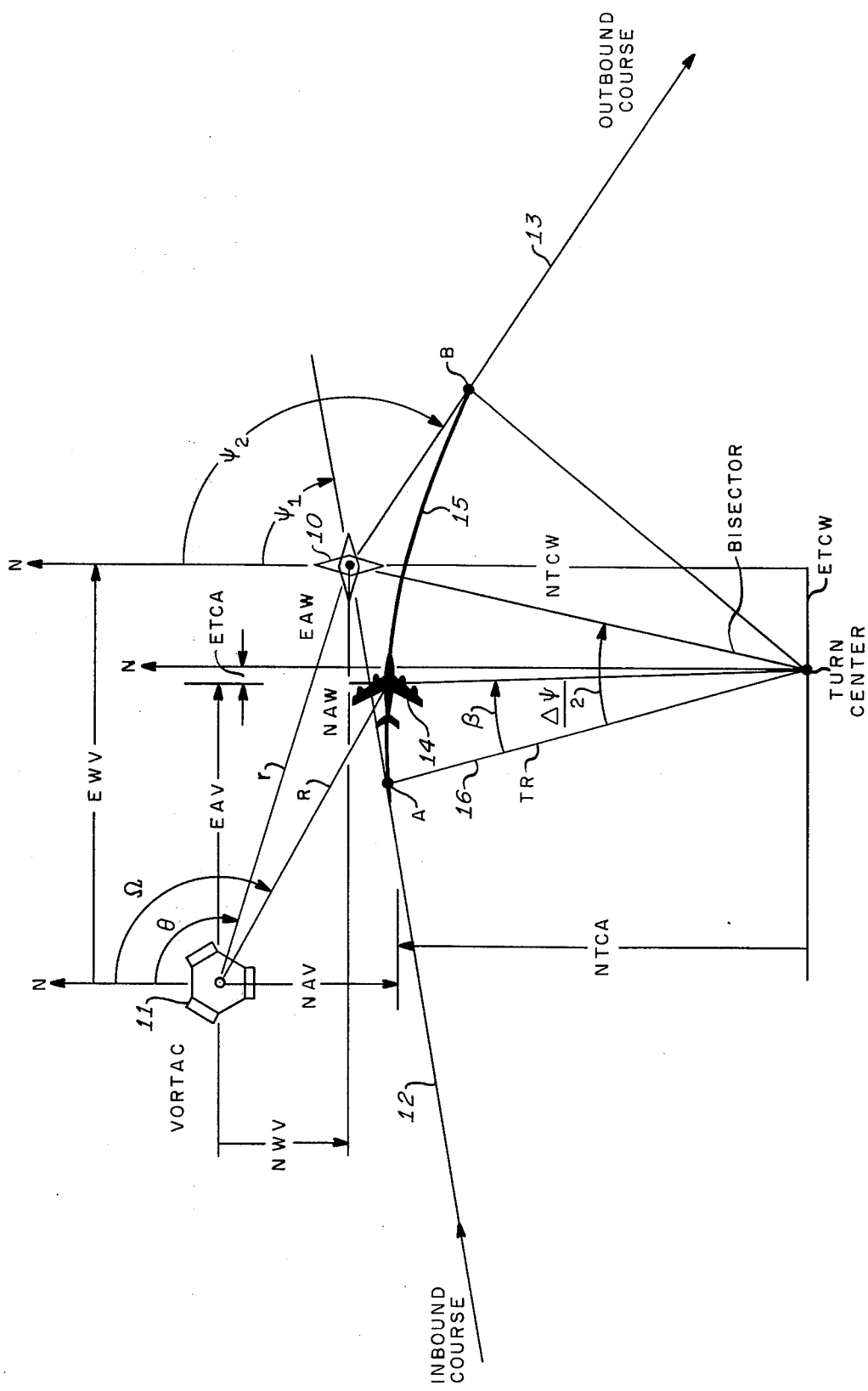
FIG. 2 is a diagram similar to FIG. 1 illustrating further geometrical parameters.
Figure 7:
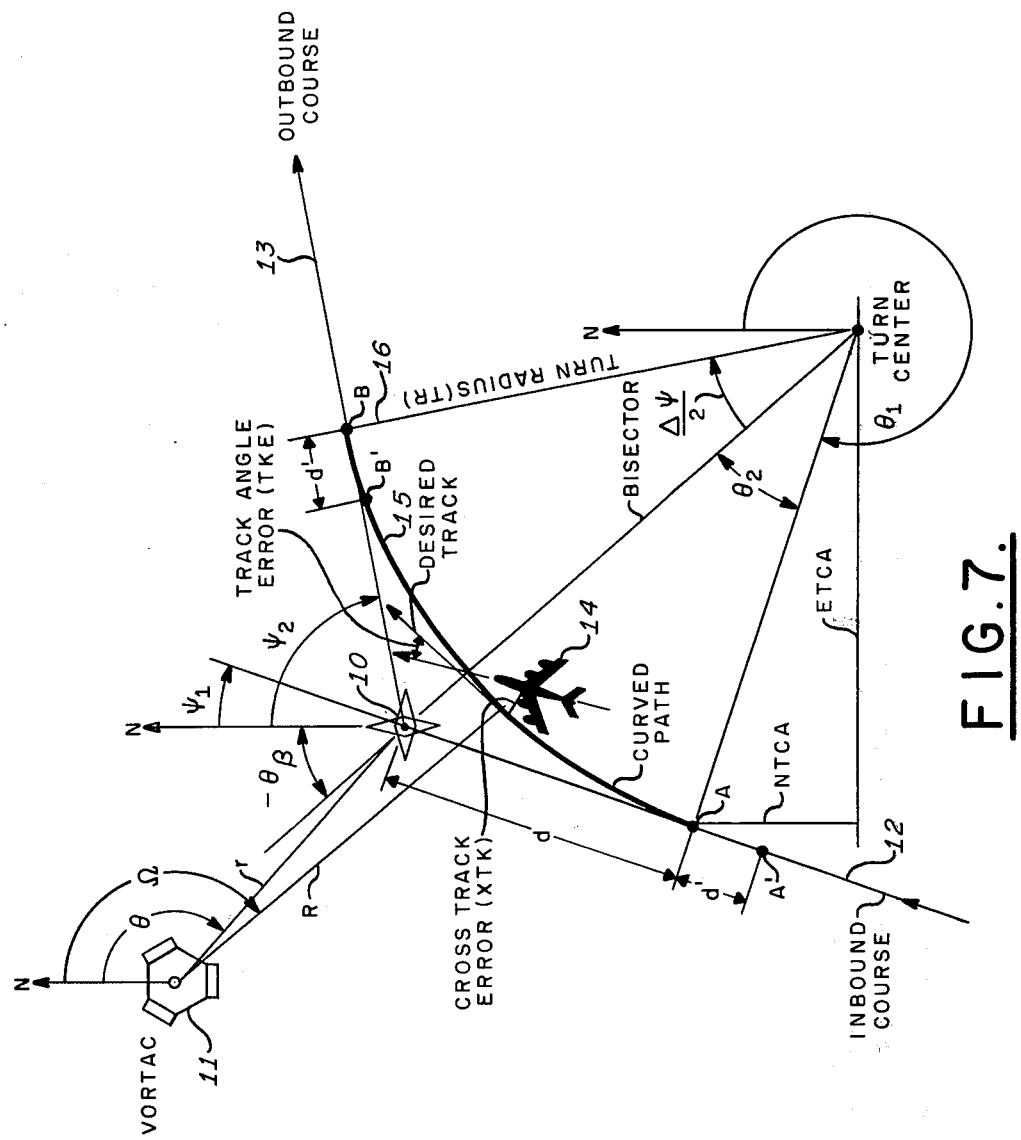
FIG. 7 is a diagram similar to FIG. 1 of the present application and identical to FIG. 1 of co-pending U.S. patent application Ser. No. 581,987, filed May 29, 1975 in the names of William C. Post and Edmond E. Olive, entitled "Steered Lateral Course Transition Control For Aircraft Area Navigation Systems" and assigned to the present assignee, said Ser. No. 581,987 to be discussed below.

In the present invention a helical vertical path is controlled as the aircraft is steered laterally over a curved transition path from the inbound to the outbound course of a waypoint. Suitable lateral steering apparatus is disclosed in detail in said patent application Ser. No. 581,987, and will be discussed below. Referring to FIGS. 1, 2 and 7, lateral navigation parameters associated with executing a transition from an inbound course to an outbound course of a waypoint of an RNAV system are illustrated. A waypoint 10 whose geographical location is determined in a well known manner by the $r,\theta$ coordinates with respect to a VORTAC 11 has an inbound course 12 and an outbound course 13 associated therewith. The inbound and outbound courses 12 and 13 with respect to north are designated as $\psi_1$ and $\psi_2$ respectively. The geographical location of an aircraft 14 is determined from the VORTAC 11 in a conventional manner by the $R,\Omega$ coordinates illustrated. The north and east components of the locations of the waypoint 10, the VORTAC 11 and the aircraft 14 with respect to each other are also illustrated. For example, the north and east coordinates of the aircraft 14 with respect to the VORTAC 11 are indicated in FIG. 2 as NAV and EAV respectively. Similarly the north and east coordinates of the waypoint 10 with respect to the VORTAC 11 are designated as NWV and EWV respectively. Furthermore, NAW and EAW designate the north and east coordinates of the aircraft 14 with respect to the waypoint 10.

A curved path 15 along which to fly the aircraft 14 in executing a transition from the inbound course 12 to the outbound course 13 is illustrated. Preferably in association with the vertical path control apparatus of the present invention the curved path 15 is circular and tangential to the inbound and outbound courses at points A and B respectively. A turning radius 16 for the curved path 15 is established in accordance with the bank angle and ground speed of the aircraft in the manner described below and in said Ser. No. 581,987. Alternatively, the turn radius TR may be a stored quantity of the system with respect to the waypoint 10 or may be inserted by the pilot in a manner to be described. The distance d is then determined which locates the point A on the inbound course 12 and in combination with the turn radius 16 locates the turn center for the curved path 15. For ease of illustration with regard to FIG. 1, the aircraft 14 is often considered to be located at point A. Thus the north and east coordinates of the aircraft 14 with regard to the turn center are designated as NTCA and ETCA respectively. Similarly, NTCW and ETCW designate the north and east coordinates of the turn center with respect to the waypoint 10.

It will be appreciated that drawings similar to FIGS. 1, 2 and 7 were discussed in detail in said Ser. No. 581,987 and the structure and operation of apparatus for controlling the lateral path transition of the aircraft 14 was discussed in detail therein as well as hereinbelow.

As the aircraft 14 executes a transition along the curved path 15, the angular position thereof with respect to the point A is denoted by the angle $\beta$ which quantity will be discussed infra with regard to the vertical path control of the present invention.

Figure 3:
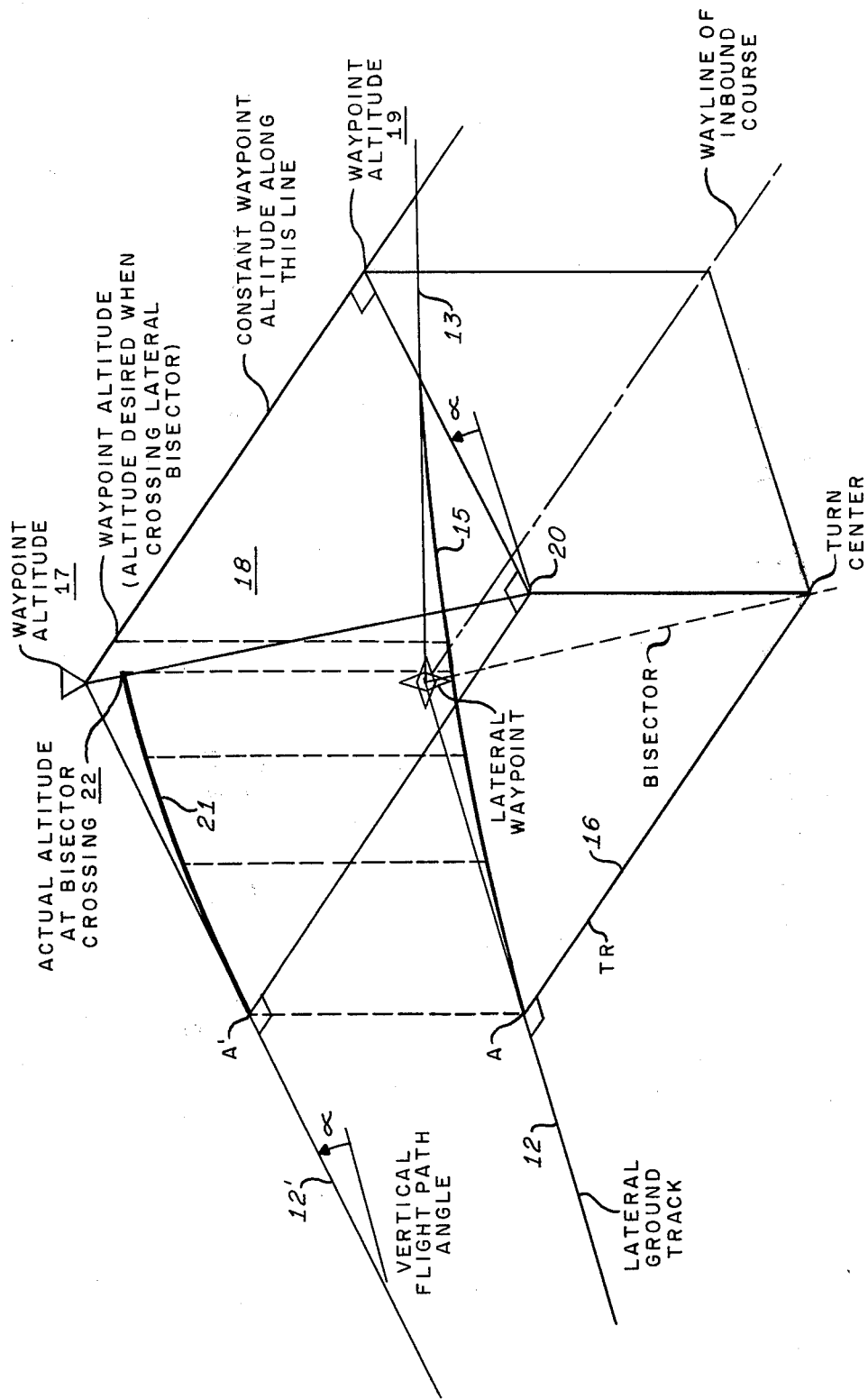
FIG. 3 is a schematic perspective diagram illustrating a vertical flight path flown in accordance with conventional RNAV techniques.

Referring now to FIG. 3 in which like reference numerals indicate like designations with respect to FIGS. 1, 2 and 7, a schematic perspective diagram of a vertical flight path flown in accordance with conventional RNAV techniques is illustrated. With regard to the lateral flight path, the aircraft approaches the waypoint 10 along the inbound course 12 and executes a transition to the outbound course 13 along the curved path 15 as explained below and in said Ser. No. 581,987. Assume the aircraft is flying along the path 12' with a vertical flight path angle $\alpha$ with respect to the horizontal so as to attain the waypoint altitude at 17. When the point A on the lateral ground track 12 is attained (or A' on the flight path 12') the craft begins the transition from the inbound course 12 to the outbound course 13. Since as described above, the conventional implementation illustrated in FIG. 3 determines the desired altitude as a function of the specified vertical angle $\alpha$ and the along track distance, a plane surface 18, as designated by the four corners A', 17, 19 and 20 thereof, is generated on which the aircraft ascends as it executes a transition to the new leg. In order to execute the curved transition path 15, the aircraft must fly across the plane 18 along a path 21, thus causing the vertical flight path angle of the craft to decrease. When the aircraft reaches point 22 on the bisector of the courses, the aircraft will not have attained the waypoint altitude 17 and a discontinuity results in the vertical path control for the new leg which starts at the point 22.

Figure 4:
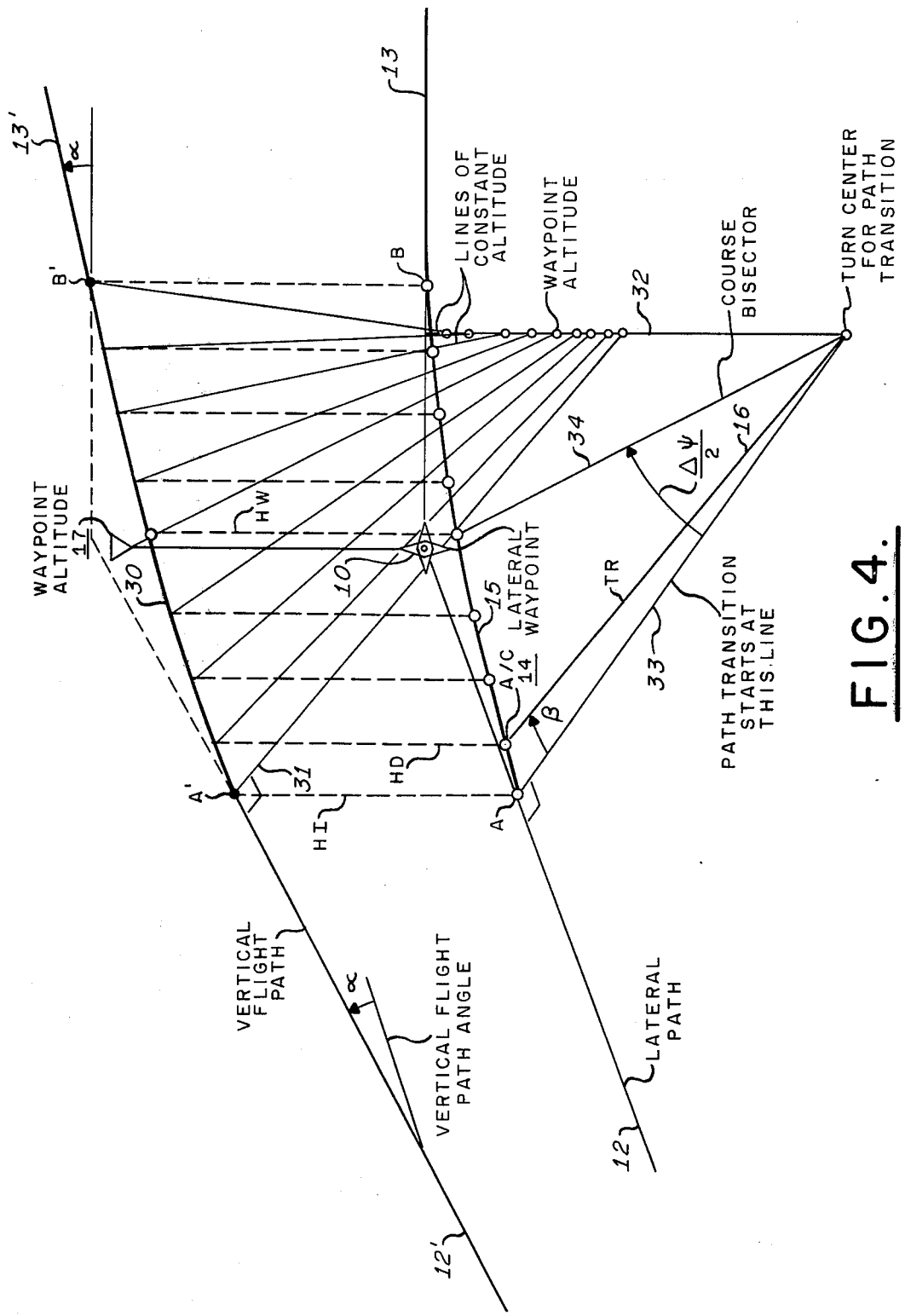
FIG. 4 is a schematic perspective diagram illustrating a helical vertical flight path flown in accordance with the present invention.

Referring now to FIG. 4 in which like reference numerals indicate like designations with regard to FIGS. 1, 2, 3 and 7, a schematic perspective diagram of a helical vertical flight path flown in accordance with the present invention is illustrated. In a manner similar to that described with respect to FIG. 3 the aircraft approaches the waypoint 10 along the inbound course 12, executes a transition along the nominal curved path 15 and departs from the waypoint 10 along the outbound course 13. The vertical flight path is again assumed to be a climbing approach to the waypoint 10 having the corresponding waypoint altitude 17, the inbound flight path 12' being parallel to the lateral path 12 with a vertical flight path angle $\alpha$ associated therewith. When the craft attains the point A' the vertical transition path 30 is entered and the transition to the next leg is completed at point B' whereat the aircraft departs along the vertical flight path 13' again with the vertical flight path angle $\alpha$. The dashed vertical lines connecting the lateral path with the vertical flight path indicate altitude lines and the solid lines 31 indicate lines of constant altitude. The constant altitude lines 31 are shown terminating on a vertical line 32 whereon the dots therealong indicate the constant altitudes of the lines 31. The lines 33 are parallel to the lines 31 with each line 31 being some altitude above the corresponding line 33.

Prior to reaching point A where the lateral curved path transition commences the aircraft 14 has been flying vertically in a plane defined by $\alpha$, the distance from the waypoint 10 and the waypoint altitude being utilized to assure that the aircraft is at the altitude Hl upon reaching the point A. The aircraft now executes a transition from the altitude H1 to the waypoint altitude HW which must be attained at the waypoint bisector while laterally flying the curved path 15 between the point A and the waypoint bisector 34.

With the aircraft 14 at the lateral position illustrated in FIG. 4 the total course change is $\Delta\psi$ with the angle between the line 33 associated with the point A and the course bisector 34 being $\Delta\psi/2$. The actual angle through which the aircraft has flown is designated as $\beta$ and the ratio of angle flown to total angle to the bisector 34 is denoted as $\gamma$ and defined as $$\gamma = \frac{\beta}{\frac{\Delta\psi}{2}}$$

The desired aircraft altitude HD for the lateral position defined by $\beta$ is $$HD = Hl + \gamma (HW - Hl)$$

Thus for any aircraft position along the constant altitude line defined by $\beta$ the desired altitude is HD. It will be appreciated that the closer the aircraft is to the center of turn for the path transition, the steeper it must climb to make good the desired altitude HD. Thus as the aircraft 14 progresses along the curved transition path 15 the desired altitude HD is proportional to the angle $\beta$ traversed with the waypoint altitude being attained at the bisector 34. It is appreciated that even if the aircraft doesn't fly the nominal path 15 the waypoint altitude is commanded at the bisector.

Figure 5:
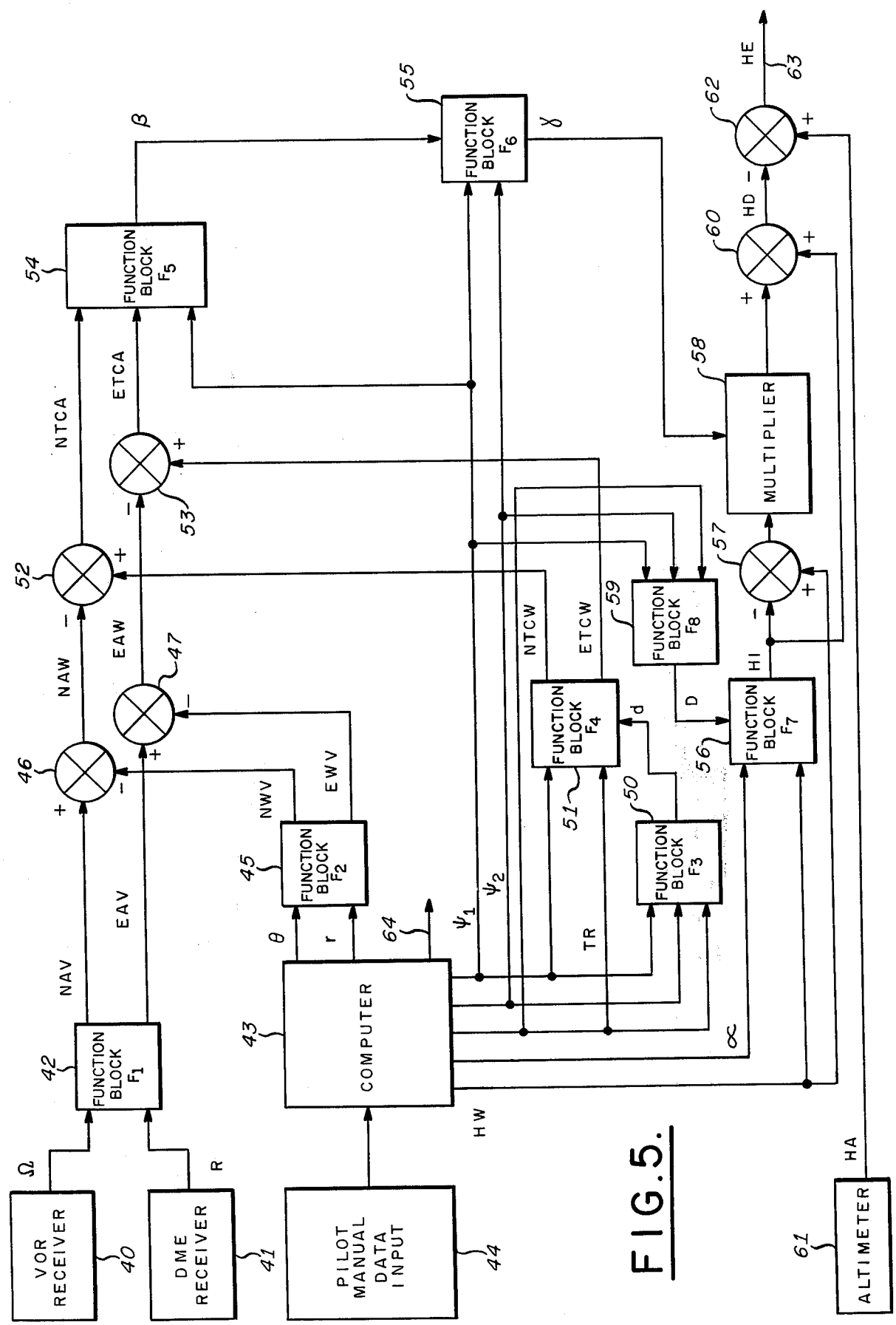
FIG. 5 is a schematic block diagram of apparatus for providing control signals to fly the aircraft in accordance with the helical vertical path of the present invention.

Referring to FIG. 5 with continued reference to the previous figures, a schematic block diagram of apparatus for providing control signals to fly the aircraft in accordance with the helical vertical flight path 30 of the present invention is illustrated. In the manner described below and in said Ser. No. 581,987, the apparatus of FIG. 5 includes a plurality of function blocks that may be implemented by any of a variety of well known devices. For example, the function blocks may be instrumented by special purpose discrete analog or digital circuits or may alternatively be implemented by general purpose digital computation apparatus.

A VOR receiver 40 provides the VOR bearing $\Omega$ and a DME receiver 41 provides the DME distance R in response to the signals from the VORTAC 11 (FIGS. 1 and 2). The distance and bearing data are applied to a function block 42 wherein a conventional coordinate conversion function $F_1$ converts the VOR and DME data to the north and east coordinates, NAV and EAV respectively of the aircraft position with respect to the VORTAC 11. Circuits for providing the function $F_1$ are well known in the art and will not be described further herein for brevity.

The apparatus of FIG. 5 also includes a computer 43 for storing the navigational and waypoint associated data with regard to the flight plan of the aircraft. For example, the computer 43 may be preloaded prior to a particular flight with the geographical locations and associated altitudes of all of the waypoints along the flight plan as well as the locations of the associated VORTACs. The computer 43 is arranged in a conventional manner to provide the required data as the aircraft executes the flight plan with regard to the sequentially encountered waypoints. For example, with the aircraft on the inbound course 12 of the waypoint 10, the computer 43 provides the pre-stored inbound and outbound courses $\psi_1$ and $\psi_2$ respectively for the waypoint 10 as well as the bearing $\theta$ and distance $r$ of the waypoint 10 with respect to the VORTAC 11. The computer 43 also provides a stored or computed quantity $\alpha$ representative of the vertical flight path angle approach to the waypoint 10, a waypoint altitude signal HW and a signal TR representative of the turn radius of the lateral course transition path 15. The quantity TR may be pre-stored in the computer 43 with respect to the waypoint 10 or the signal may be computed in the manner described in detail below and in said Ser. No. 581,987.

The computer 43 receives signals from a pilot manual data input device 44 by which the pilot may alter the data stored in the computer 43 or may enter new data therein. The device 44 may, for example, be implemented as a conventional alphanumeric and discrete data keyboard entry device for providing the data to the computer 43 in a well known manner. The device 44 may be utilized, for example, when the pilot wishes to deviate from the flight plan as stored in the computer 43.

The bearing and distance data ($\theta,r$) of the waypoint 10 with respect to the VORTAC 11 are applied to a function block 45. The block 45 in a well known manner instruments a conventional coordinate conversion function $F_2$ for converting the $\theta,r$ data to the north and east coordinates NWV and EWV respectively of the waypoint with regard to the VORTAC. The signals NAV from the block 42 and NWV from the block 45 are applied to an algebraic summing device 46 to provide the north coordinate NAW of the aircraft 14 with respect to the waypoint 10. Similarly the EAV signal from the block 42 and the EWV signal from the block 45 are applied to an algebraic summing device 47 to provide the east coordinate EAW of the aircraft 14 with respect to the waypoint 10.

The $\psi_1$ and $\psi_2$ signals as well as the turn radius signal TR from the computer 43 are applied to a function block 50 to generate a signal $d$ in accordance with the distance between the point A and the waypoint 10 of FIG. 1. The distance $d$ is generated in accordance with a function $F_3$ as follows:

$$F_3 = d = TR \tan \frac{\Delta\psi}{2}$$

where $\Delta\psi = \psi_2 - \psi_1$. As previously described, it is appreciated that the function $F_3$ is readily instrumented by any of a variety of suitable and well known analog and digital circuits.

The $\psi_1$ signal and the turn radius TR signal from the computer 43 and the $d$ signal from the function block 50 are applied to a function block 51 to generate the north and east coordinates of the turn center location with respect to the waypoint 10 as illustrated in FIG. 2, in accordance with a function $F_4$ as follows:

$$F_4 = \begin{cases} NTCW = -d \cos \psi_1 - TR \sin \psi_1 \\ ETC_W = -d \sin \psi_1\, TR \cos \psi_1 \end{cases}$$

The block 51 is implemented in any convenient manner as described above with respect to the block 50.

The NTCW signal from the block 51 and the NAW signal from the algebraic summing device 46 are combined in an algebraic summing device 52 to provide the NTCA north coordinate of the aircraft location with respect to the turn center. In a similar manner, an algebraic summing device 53 combines the ETCW signal from the block 51 with the EAW signal from the algebraic summing device 47 to provide the ETCA coordinate signal of the aircraft location with respect to the turn center.

The NTCA and ETCA signals from the devices 52 and 53 respectively, as well as the $\psi_1$ signal from the computer 43 are applied as inputs to a function block 54 wherein the quantity $\beta$, as illustrated in FIGS. 1, 2 and 4, is generated in accordance with a function $F_5$ as follows:

$$F_5 = \beta = \tan^{-1} \frac{NTCA}{ETCA} - (\psi_1 - 90°)$$

where $\beta$ represents the angular position of the aircraft on the curved path 15.

The $\beta$ signal from the function block 54 as well as the $\psi_1$ and $\psi_2$ signals from the computer 43 are applied to a function block 55 to generate the $\nu$ signal in accordance with a function $F_6$ as follows:

$$F_6 = \gamma = \frac{\beta}{\frac{\Delta\psi}{2}}$$

where $\gamma$ is the ratio of the angle $\beta$ flown to the total angle $\Delta\psi/2$ to the bisector and where $\Delta\psi = \psi_2 - \psi_1$.

The $\psi_1$ and $\psi_2$ signals as well as the turn radius signal TR from computer 43 are applied to a function block 59 to generate a signal $d$ in accordance with the arc length on the preferred path 15 from point A to the bisector of FIG. 1. The distance $D$ is generated in accordance with a function $F_8$ as follows:

$$F_8 = D = TR \frac{\Delta\psi}{2}$$

where $\Delta\psi = \psi_2 - \psi_1$. As previously described, it is appreciated that the function $F_8$ is readily instrumented by any of a variety as suitable and well known analog and digital circuits.

The waypoint altitude signal HW and the vertical flight path angle signal $\alpha$ from the computer 43 as well as the D signal from the function block 59 are applied to a function block 56 wherein the altitude Hl as illustrated in FIG. 4 is generated in accordance with a function $F_7$ as follows:

$$F_7 = Hl = HW - D \tan \alpha$$

The Hl signal from the function block 56 and the HW signal from the computer 43 are applied to algebraic summing device 57 to provide the quantity HW − Hl. The output from the function block 55 and the output from the algebraic summing device 57 are applied to a multiplier 58 which provides the term $\gamma$ (HW − Hl). The output from the multiplier 58 as well as the Hl output from the function block 56 are applied to an algebraic summing device 60 for providing the desired altitude HD signal as follows:

$$HD = Hl + \gamma (HW - Hl)$$

The actual altitude HA of the aircraft as obtained from an altimeter 61 is combined with the HD signal from the algebraic summing device 60 in an algebraic summing device 62 to provide an altitude error signal HE = HA − HD on a lead 63.

Preferably the altitude error signal HE on the lead 63 is applied to the pitch channel of the aircraft automatic flight control system and also to the vertical steering cue of the attitude director indicator of the flight director system of the craft. The signal on the lead 63 may also be applied to the glide slope vertical deviation indicator of the horizontal situation indicator instrument of the aircraft to provide control and display indications to the pilot.

It will be appreciated that as the aircraft is controlled to follow the vertical transition path 30 (FIG. 4) the craft is also steered to follow the lateral transition path and a lead 64 from the computer 43 is illustrated in FIG. 5 for providing the lateral steering and deviation signals as explained below and in said Ser. No. 581,987.

In operation the aircraft is steered along the lateral flight path comprising the inbound track 12, the curved transition path 15 and the outbound track 13 of FIG. 4 in the manner described below and in said Ser. No. 581,987. When the aircraft reaches the point A' on the inbound course 12' (FIG. 4) corresponding to the point A on the lateral ground track, aircraft control is switched by conventional means not shown from the standard vertical planar control to the helical path control of FIG. 5. The path transition begins when the flight path intercepts the first of the lines 31 at point A' which line is perpendicular to the track 12'. The details of the transition criteria are described below and in said Ser. No. 581,987. As the aircraft progresses along the transition path 30, the desired altitude HD is proportional to the angle $\beta$ traversed with the waypoint altitude being attained at the waypoint bisector. This flight path is controlled by the apparatus of FIG. 5 by taking the difference between the waypoint altitude and the desired altitude at the start of the circular path transition and then commanding the aircraft via the vertical error term HE on the lead 63 to an altitude which is the starting altitude Hl plus a portion of the altitude difference HW − Hl according to the percentage $\gamma$ of the circular path which has been flown. For example, if the aircraft is angularly half way to the bisector, then the commanded altitude is the starting altitude plus half the difference altitude. This control law generates a family of curves which form a helical surface. The aircraft is controlled either automatically through the automatic flight control system (AFCS) or manually via the flight director or glide slope deviation indicator of the HSI such that the vertical error HE remains zero, whereby the aircraft attains the waypoint altitude at the bisector even if the aircraft deviates from the nominal ground track 15.

It will be appreciated from the foregoing that the aircraft flies along a helical surface from the point A' to the waypoint bisector irrespective of the lateral steering control law utilized in the system, thus assuring that the waypoint altitude is attained at the bisector. The pitch of the helix is determined by the function block 56 as the vertical flight path angle $\alpha$. When the aircraft follows the desired lateral curved path 15 of specified radius TR the desired vertical path is constructed such that if the aircraft flies the specified radius then the commanded vertical flight path angle will be constant. If, however, the aircraft deviates from the specified radius, the commanded vertical angle will be increased when the actual radius is smaller than the specified radius and decreased when the actual radius is larger than the specified radius. This is characteristic of a family of paths which form a helix. When the aircraft reaches the point B (FIG. 4), vertical control is switched by conventional means not shown to revert to the standard planar vertical control law.

Figure 6:
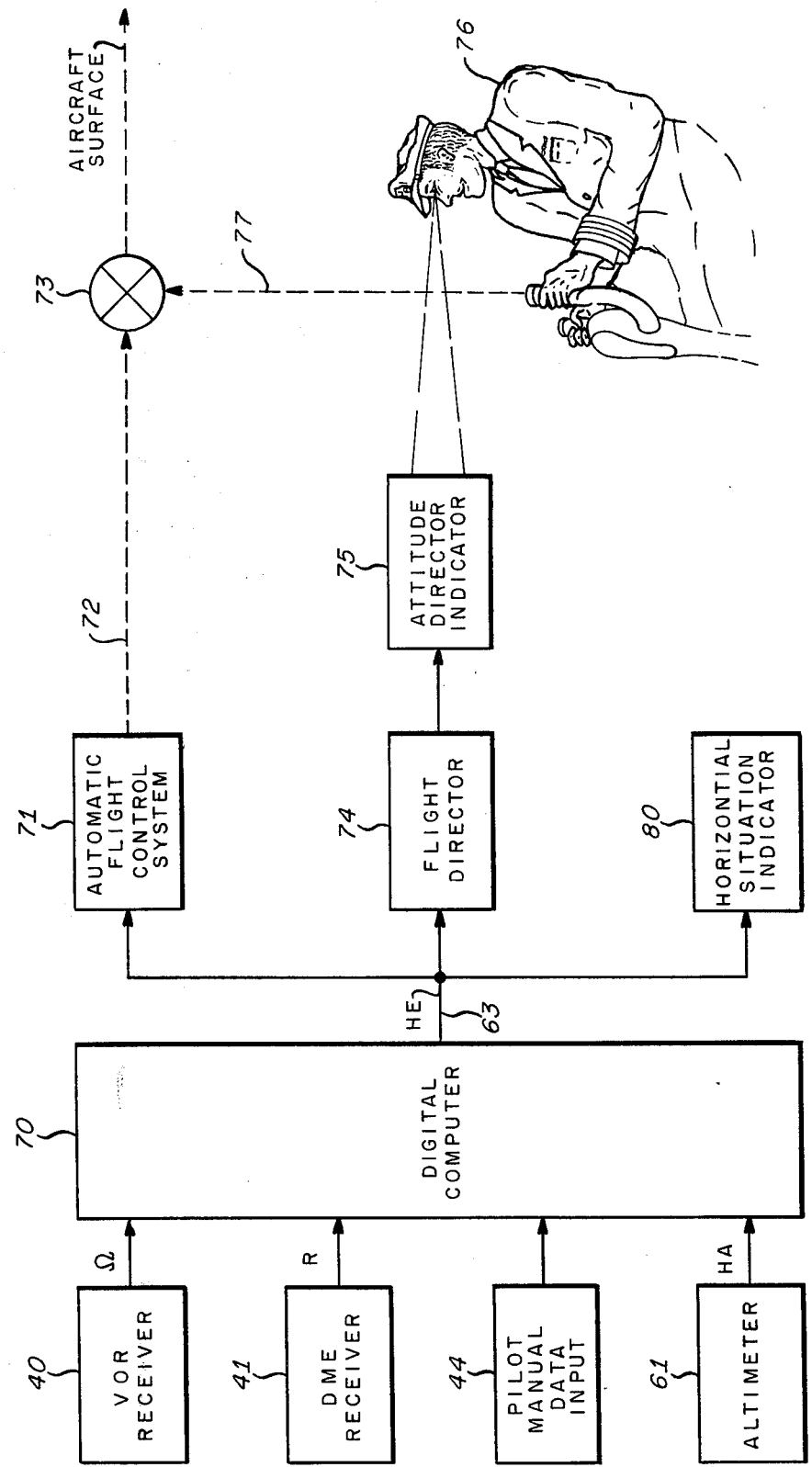
FIG. 6 is a schematic block diagram of an alternative embodiment of the invention.

Referring now to FIG. 6 in which like reference numerals indicate like components with respect to FIG. 5, an alternative embodiment of the invention is illustrated. The VOR receiver 40, the DME receiver 41, the pilot manual data input device 44 and the altimeter 61 provide inputs to a programmed general purpose digital computer 70, the data inputs from the blocks 40, 41, 44 and 61 being similar to those described above with respect to FIG. 5. It will be appreciated that conventional analog-to-digital converters (not shown) may be utilized at the input interface of the computer 70 where appropriate. The computer 70 is programmed to provide the vertical error HE on the lead 63, the nature and purpose of this signal having been previously described with respect to FIG. 5.

The computer 70 is programmed in a conventional and well known manner to provide the NAV and EAV signals as described above from the VOR and DME data. Additionally, in a manner similar to that described above with regard to the computer 43 of FIG. 5, the computer 70 stores the $\psi_1$, $\psi_2$, $\theta$, $r$, TR, $\alpha$ and HW data with regard to the VORTACs and waypoints of the flight plan. These data may also be altered and supplemented by the pilot manual data input device 44 in the manner previously described. The computer 70 is furthermore programmed in a conventional and well known manner to provide the NWV and EWV signals from the $\theta$ and $r$ data stored therein.

With the above described parameters internally available, the computer 70 is programmed to provide the HE signal in accordance with the following program Chapin chart:

PROGRAM CHAPIN CHART $NAW = NAV - NWV$
$EAW = EAV - EWV$
$\Delta\psi = \psi_2 - \psi_1$
$D = TR\Delta\psi/2$
$d = TR \text{TAN} \frac{\Delta\psi}{2}$
$NTCW = -d*\cos \psi_1 - TR*\sin \psi_1$
$ETCW = -d*\sin \psi_1 + TR*\cos \psi_1$
$NTCA = NTCW - NAW$
$ETCA = ETCW - EAW$
$\beta = \text{TAN}^{-1} \frac{NTCA}{ETCA} - (\psi_1 - 90°)$
$\gamma = \frac{\beta}{\frac{\Delta\psi}{2}}$
$Hl = HW - D*\text{TAN}\alpha$
$HD = Hl + \gamma(HW - Hl)$
$HE = HA - HD$ As is known to those skilled in the art, the Program Chapin Chart represents a convenient format, similar to the familiar program flow chart, for organizing the details of the computation to be performed preparatory to coding by the programmer. It will furthermore be readily appreciated by those skilled in the art that coding is generated in a routine manner from the above Chapin chart in any convenient programming language associated with the computer utilized and will not be further described herein for brevity. It will be appreciated that the digital value of HE is converted by a conventional digital-to-analog device (not shown) to provide the associated analog signal as required.

The vertical error signal HE on the lead 63 is applied to the pitch channel of the automatic flight control system 71 of the aircraft to control the craft along the vertical transition path 30 of FIG. 4. Accordingly, the output of the AFCS 71 is applied through appropriate linkages 72 and a mechanical summing device 73 to control the aircraft pitch attitude surfaces. The signal HE is also applied to the aircraft flight director 74 which includes the conventional attitude director indicator 75 with the vertical error signal HE being applied to the vertical steering cue of the attitude director indicator 75. In a conventional manner the pilot 76 applies manual control signals via appropriate controls and linkages 77 to control the aircraft along the vertical path 30 by maintaining the vertical steering cue of the attitude director indicator 75 centered in a well known manner.

The vertical error signal HE on the lead 63 is also applied to the glide slope vertical deviation meter of the horizontal situation indicator (HSI) 80 of the aircraft. It will be appreciated that the pilot 66 in addition to being apprised of the vertical condition of the aircraft by observation of the instrument 80, may also utilize the displayed information to control the aircraft along the vertical path 30 of FIG. 4 via the controls and linkages 77. For example, by maintaining the glide slope deviation cue centered, the aircraft is controlled to follow the vertical transition path 30 and hence to make good the waypoint altitude at the bisector.

It will be appreciated from the foregoing that the present invention provides smooth continuous vertical guidance during lateral course changes and assures that the aircraft will be commanded to the correct final altitude regardless of the radius flown. The invention provides a constant vertical flight path angle if the aircraft flies the nominal lateral path and eliminates any discontinuities when starting the next vertical control problem, the flight path angle being that commanded during lateral straight line flight. Although the preferred embodiments of the invention utilize the lateral control apparatus of said Ser. No. 581,987, as described, below it will be appreciated that any lateral steering control law may be utilized with the vertical helical path of the invention providing at least the advantage of attaining the waypoint altitude at the bisector.

It will be appreciated from the foregoing that the computer 43 provides signals on the lead 64 for laterally controlling the aircraft to execute a transition from the inbound to the outbound leg of the waypoint. It will furthermore be appreciated that the blocks 55–58 and 60 comprise means for computing a helical vertical flight path from the inbound leg to the outbound leg and intersecting the waypoint altitude at the beginning of the outbound leg. The altimeter 61 and summing junction 62 comprise means for generating deviation signals with respect to the helical vertical path for constraining the aircraft to fly said helical vertical path in executing the transition from the inbound to the outbound leg.

Reference has been made above to the lateral control apparatus of said Ser. No. 581,987. The following is a detailed description of this apparatus.

As discussed above with respect to FIGS. 1, 2 and 7, the curved path 15 is generated along which to fly the aircraft 14 to effect the transition from the inbound course 12 to the outbound course 13. Preferably the curved path 15 is circular and tangential to the inbound and outbound courses at points A and B respectively. A maximum aircraft bank angle for the transition is determined as a function of aircraft ground speed and angular difference between the inbound and outbound courses. With the bank angle determined, a turning radius 16 for the curved path 15 is established in accordance with the maximum bank angle and the aircraft ground speed. The distance $d$ is then determined which locates the point A on the inbound course 12 and in combination with the turn radius 16 locates the turn center for the curved path 15.

In order for the aircraft 14 to fly the path 15, the maximum bank angle is established at point A with the aircraft returning to zero bank angle at point B. However, since the aircraft 14 cannot be rolled into and out of the maximum bank attitude instantaneously, the associated roll command is applied and removed at points A' and B' respectively, (FIG. 7). The distances $d'$ from the points A' and B' are determined from considerations of passenger comfort and aircraft roll response in accordance with the specific aircraft to which the invention is applied.

With the aircraft 14 at the commanded bank angle at point A, the craft heading rate maintains the aircraft on the curved path 15 in an idealized calm air environment. However, due to winds, velocity changes, trim conditions, and the like, the aircraft 14 will deviate from the curved path 15. In order to correct for these deviations the cross track error (XTK) (FIG. 7) and the track angle error (TKE) (FIG. 7) with respect to the curved path 15 are generated to steer the aircraft and provide pilot displays in a manner to be described. For ease of illustration with regard to FIGS. 1 and 7, the aircraft 14 is often considered to be located at point A. Thus the north and east coordinates of the aircraft 14 with regard to the turn center are designated as NTCA and ETCA respectively. Similarly, NTCW and ETCW designate the north and east components of the turn center with respect to the waypoint 10.

Figure 8:
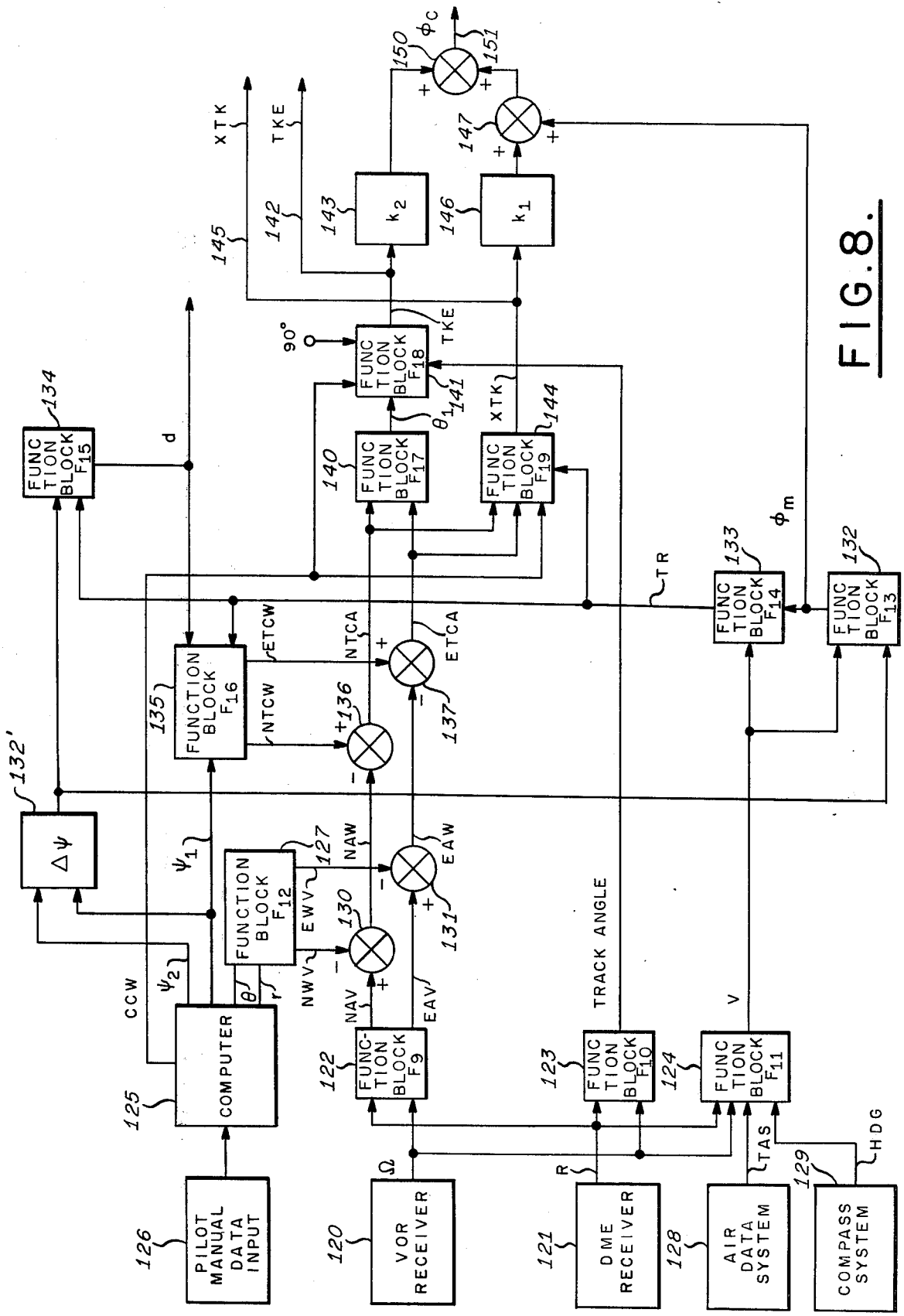
FIG. 8 is a schematic block diagram of the lateral transition path generation and control apparatus of said Ser. No. 581,987 and is identical in substance to FIG. 3 thereof.

Referring to FIG. 8 with reference to FIGS. 1, 2 and 7, a schematic block diagram of apparatus for generating the curved path 15 and for controlling the aircraft 14 to fly therealong in executing a transition from the inbound course to the outbound course of the waypoint 10, is illustrated. The apparatus of FIG. 8 includes a plurality of function blocks that may be implemented by any of a variety of well known devices. For example, the function blocks may be instrumented by special purpose discrete analog or digital circuits or may alternatively be implemented by general purpose digital computation apparatus.

A VOR receiver 120 provides the VOR bearing $\Omega$ and a DME receiver 121 provides the DME distance R in response to the signals from the VORTAC 11. The distance and bearing data are applied to a function block 122 wherein a well known coordinate conversion function $F_9$ converts the VOR and DME data to the north and east coordinates, NAV and EAV respectively, of the aircraft with respect to the VORTAC 11. Circuits for providing the function $F_9$ are well known in the art and will not be described further herein for brevity. The VOR and DME data are also applied to function blocks 123 and 124 wherein conventional circuitry implementing functions $F_{10}$ and $F_{11}$ provide the track angle and the ground speed V respectively of the aircraft 14. It will be appreciated that aircraft heading (HDG) from a conventional compass system 129 and true airspeed (TAS) from a conventional air data system 128 may be utilized as inputs to the function block 124 thereby generating a current and accurate value of the ground speed V. The function $F_{11}$ of the block 124 may be implemented as disclosed in U.S. Pat. application Ser. No. 465,228 filed Apr. 29, 1974 in the names of Donald H. Baker and Larry J. Bowe entitled "Radio Navigation System" and assigned to the assignee of the present invention and now U.S. Pat. No. 3,919,529.

The apparatus of FIG. 8 also includes a computer 125 for storing the navigational data with regard to the flight plan of the aircraft. For example, the computer 125 may be preloaded prior to a particular flight with the geographical locations of all of the waypoints along the flight plan as well as the locations of the associated VORTACs. The computer is arranged in a conventional manner to provide the required data as the aircraft executes the flight plan with regard to the sequentially encountered waypoints. For example, with the aircraft on the inbound course 12 of the waypoint 10, the computer 125 provides the pre-stored inbound and outbound courses $\psi_1$ and $\psi_2$ respectively for the waypoint 10 as well as the bearing $\theta$ and distance $r$ of the waypoint 10 with respect to the VORTAC 11. The computer 125 also provides a control signal CCW in accordance whether the turn from the inbound course 12 to the outbound course 13 is clockwise or counterclockwise.

The computer 125 receives signals from a pilot manual data input device 126 by which the pilot may alter the data stored in the computer 125 or may enter new data therein. The device 126 may, for example, be implemented as a conventional alphanumeric and discrete data keyboard entry device for providing the data to the computer 125 in a well known manner. The device 126 may be utilized, for example, when the pilot wishes to deviate from the flight plan as stored in the computer 125.

The bearing and distance data ($\theta,r$) of the waypoint 10 with respect to the VORTAC 11 is applied to a function block 127. The block 127 in a well known manner instruments a conventional coordinate conversion function $F_{12}$ for converting the $\theta,r$ data to the north and east coordinates NWV and EWV respectively of the waypoint with regard to the VORTAC. The signals NAV from the block 122 and NWV from the block 127 are applied to an algebraic summing device 130 to provide the north coordinate NAW of the aircraft 114 with respect to the waypoint 10. Similarly, the EAV signal from the block 122 and the EWV signal from the block 127 are applied to an algebraic summing device 131 to provide the east coordinate EAW of the aircraft 14 with respect to the waypoint 10.

The inbound and outbound course signals $\psi_1$ and $\psi_2$ from the computer 125 are applied to a function block 132' that computes the function $\Delta\psi = \psi_2 - \psi_1$. The $\Delta\psi$ signal from the function block 132' as well as the ground speed signal V from the function block 124 are applied to a function block 132. The function block 132 provides the maximum desired bank angle $\phi_m$ in accordance with a functional relationship $F_{13}$ of the track change $\Delta\psi = \psi_2 - \psi_1$ and the ground speed V. The desired bank angle $\phi_m$ is determined substantially as the pilot would from aircraft speed and the magnitude of the heading change. The faster the aircraft is moving, the lower the desired bank angle should be to provide a "smooth" ride. The larger the required heading change, the steeper the desired bank angle should be for practical reasons. The bank angle command $\phi_m$ is applied at point A' (FIG. 7) such that the aircraft will have assumed the bank angle when it reaches point A, thus causing the craft to execute the curved path 15 in a manner to be described.

Figure 9:
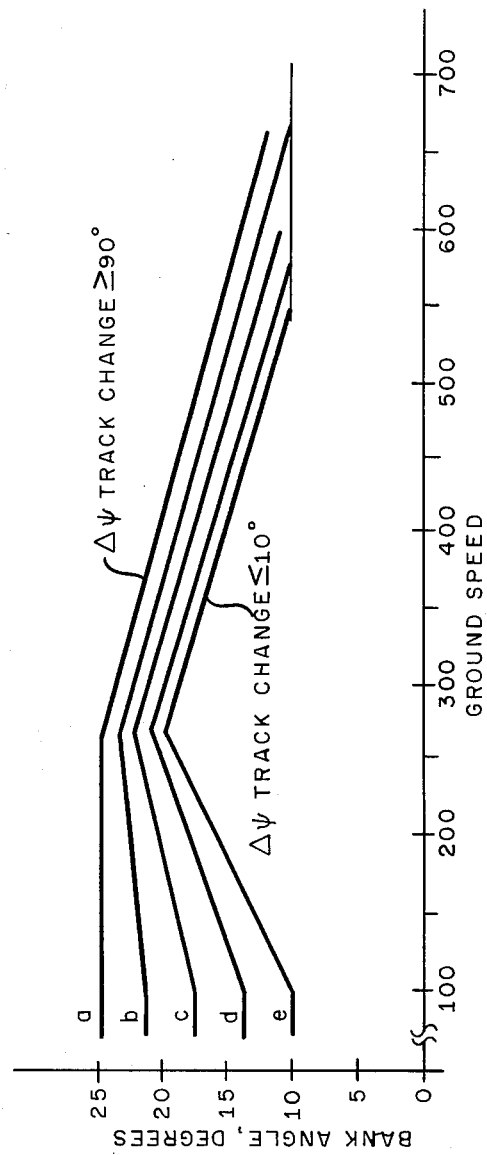
FIG. 9 is a graph depicting the functional relationship of desired bank angle with regard to ground speed and track change angle of said Ser. No. 581,987 and is identical to FIG. 4 thereof.

It will be appreciated that the functional relationship $F_{13}$ implemented by the block 132 is selected in accordance with the particular characteristics of the aircraft in which the system is installed. Referring to FIG. 9, typical functional relationships suitable for use in modern jet transports are illustrated. Functional relationship lines a, b, c, d and e represent track changes of $\geq$ 90°, 70°, 50°, 30°, and $\leq$ 10° respectively. The functional relationships of FIG. 9 are readily implemented by such conventional devices as storage tables, diode matrices and the like. It will be appreciated that the block 132 is responsive to the signal $\Delta\psi = \psi_2 - \psi_1$, from the block 132 and this difference signal together with the ground speed V from the block 124 addresses the function generating apparatus to provide the associated value $\phi_m$ as illustrated in FIG. 9.

Referring again to FIG. 8, the bank angle signal $\phi_m$ from the block 132 and the ground speed signal V from the block 124 are applied to a function block 133 to generate the turn radius (TR) 16 (FIG. 7) for the circular path 15 in accordance with a function $F_{14}$ as follows:

$$F_{14} = TR = \frac{V^2}{g \tan \phi_m}$$

where $g$ is the gravity constant. As previously described, it is appreciated that the function $F_{14}$ is readily instrumented by any of a variety of suitable and well known analog and digital circuits.

The $\Delta\psi$ signal from the function block 132' as well as the turn radius signal TR from the function block 133 are applied to a function block 134 to generate a signal $d$ in accordance with the distance between the point A and the waypoint 10 of FIG. 7. The distance $d$ is generated in accordance with a function $F_{15}$ as follows:

$$F_{15} = d = TR \text{ TAN } \frac{\Delta\psi}{2}$$

where, as previously discussed, $\Delta\psi = \psi_2 - \psi_1$. The block 134 is implemented in any convenient manner in accordance with the function $F_{15}$ as discussed above with regard to the block 133.

The $\psi_1$ signal from the computer 125, the turn radius TR signal from the function block 133 and the $d$ signal from the function block 134 are applied to a function block 135 to generate the north and east coordinates of the turn center location with respect to the waypoint 10 as illustrated in FIG. 2, in accordance with a function $F_{16}$ as follows:

$$F_{16} = \begin{cases} NTCW = -d \cos \psi_1 - TR \sin \psi_1 \\ ETCW = -d \sin \psi_1 + TR \cos \psi_1 \end{cases}$$

The block 135 is implemented in any convenient manner as described above with respect to the block 133.

The NTCW signal from the block 135 and the NAW signal from the algebraic summing device 130 are combined in an algebraic summing device 136 to provide the NTCA north coordinate of the aircraft location with respect to the turn center. In a similar manner, an algebraic summing device 137 combines the ETCW signal from the block 135 with the EAW signal from the algebraic summing device 131 to provide the ETCA coordinate signal of the aircraft location with respect to the turn center. The NTCA and ETCA signals are applied as inputs to a function block 140 wherein the quantity $\theta_1$ as illustrated in FIG. 7 is generated in accordance with a function $F_{17}$ as follows:

$$F_{17} = \phi_1 = TAN^{-1} \frac{NTCA}{ETCA}$$

where $\theta_1$ represents the angular position of the aircraft on the curved path 15.

The track angle signal from the function block 123, the CCW signal from the computer 125 and the $\theta_1$ signal from the function block 140, as well as a constant signal representing 90° are applied to a function block 141 to generate the track angle error TKE in accordance with a function $F_{18}$ as follows:

$$F_{18} = \begin{cases} TKE = (\phi_1 - 90°) - \text{TRACK ANGLE for } CCW \text{ turns} \\ TKE = (\phi_1 + 90°) - \text{TRACK ANGLE for } CW \text{ turns} \end{cases}$$

The TKE signal is applied to a line 142 as well as to a gain block 143. The gain block 143 applies a gain $k_2$ to the TKE signal in a well known manner, the gain being selected and conventionally adjusted in accordance with the aircraft characteristics and velocity.

The CCW signal from the computer 125, the turn radius signal TR from the function block 133, the NTCA signal from the summing device 136 and the ETCA signal from the summing device 137 are applied to a function block 144 for generating the cross track error signal XKT in accordance with a function $F_{19}$ as follows:

$$F_{19} = \begin{cases} XTK = \sqrt{NTCA^2 + ETCA^2} - TR \text{ for } CCW \text{ turns} \\ XTK = TR - \sqrt{NTCA^2 + ETCA^2} \text{ for } CW \text{ turns} \end{cases}$$

The XKT signal is applied to a lead 145 as well as to a gain block 146 which imparts a gain $k_1$ to the XKT signal in a manner similar to that described with respect to the block 143. The gain adjusted XTK signal from the block 146 is combined with the $\phi_m$ signal from the block 132 in an algebraic summing device 147. The output of the algebraic summing device 147 and the gain adjusted TKE signal from the block 143 are combined in an algebraic summing device 150 to provide the system steering signal $\phi_c$ on a lead 151. The $\phi_c$ signal may be expressed as follows:
$$\phi_c = \phi_m + k_1 \text{ XTK} + k_2 \text{ TKE}$$
Preferably the steering signal $\phi_c$ on the lead 151 is applied to the roll channel of the aircraft automatic flight control system and also to the lateral steering cue of the attitude director indicator of the flight director system of the craft. The track angle error signal TKE on the lead 142 is preferably applied to the commanded heading bug of the horizontal situation indicator instrument of the aircraft while the cross track error signal XTK on the lead 145 is applied to the lateral deviation indicator of the horizontal situation indicator.

In operation, when the aircraft reaches the point A' (FIG. 7) as indicated by the signal $d$ from the block 134 and the above discussed predetermined value of $d'$, aircraft control is switched by conventional means not shown from the straight line control apparatus for the inbound course 12 (FIG. 7) to the curved path control apparatus of FIG. 8. The $\phi_m$ signal from the block 132 applied via elements 147 and 150 to the lead 151 causes the aircraft to assume the bank angle $\phi_m$ at the point A. The bank angle $\phi_m$ then causes the craft to endeavor to turn about the turn center as determined by the NTCA and ETCA signals from the elements 136 and 137 respectively with a turn radius TR as determined by the block 133. When the craft is on the curved path 15 the track angle error signal on the lead 142 and the cross track error signal on the lead 145 are both zero and thus the steering command $\phi_c$ is equal to the bank angle command $\phi_m$ which tends to maintain the craft on the curved path 15 by maintaining the craft banked at the angle $\phi_m$. When the craft departs from the curved path 15, due for example to transients such as wind and the like or aircraft configuration changes, the combination of the track angle error from the block 141 and the cross track error signal from the block 144 combined in the steering command $\phi_c$ tend to steer the aircraft back to the curved path 15.

When the craft reaches the point B' (FIG. 7) as determined from the computed value of $d$ and the predetermined value of $d'$ as discussed above, aircraft control is switched by means not shown from the curved path control apparatus of FIG. 8 to the straight line control apparatus with regard to the outbound course 13 and thus the aircraft rolls back to wings level flight by the time it reaches point B, completing the transition from the inbound course 12 to the outbound course 13 of the waypoint 10.

It will be appreciated that since the cross track error from the block 144 is applied via the lead 145 to the lateral deviation cue of the horizontal situation indicator (HSI) and since the error is computed with respect to the curved path 15 as the aircraft executes the course transition, it is merely necessary that the pilot maintains the lateral deviation indicator centered in order to make good the desired curved path. Similarly, since the track angle error from the block 141 is applied via the lead 142 to the commanded heading bug of the HSI and the error is computed with respect to the curved path 15, the commanded heading bug remains centered under the index of the HSI as the craft executes the course transition along the curved path 15. The turn rate of the craft along the curved path 15 is displayed to the pilot by reason of the compass card of the HSI slewing under the commanded heading bug at a rate equal to the turning rate of the craft until the new course is achieved at point B of FIG. 7.

It will be appreciated that many of the components of FIG. 8 are identical to those of FIG. 5. The following paired components are identical with respect to the two figures: 40 and 120; 41 and 121; 42 and 122; 44 and 126; 45 and 127; 46 and 130; 47 and 131; 50 and 134; 51 and 135; 52 and 136; 53 and 137. With regard to the computers 43 and 125 it will be appreciated that these components can be combined into one computer providing all of the outputs described.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In an area navigation system for aircraft, apparatus for controlling the vertical flight path of the aircraft when executing a transition from an inbound course to an outbound course of a waypoint having an altitude associated therewith, said inbound and outbound courses defining waypoint inbound and outbound legs respectively, comprising
   lateral transition path control means for laterally controlling said aircraft to execute said transition from said inbound to said outbound leg,
   helical path computing means for computing a helical vertical flight path from said inbound leg to said outbound leg and intersecting said waypoint altitude at the beginning of said outbound leg, and
   deviation signal generating means for generating deviation signals with respect to said helical vertical path for constraining said aircraft to fly said helical vertical path in executing said transition from said inbound to said outbound leg.

2. The apparatus of claim 1 in which said helical path computing means comprises means for generating said helical path intersecting said waypoint altitude at the bisector of said inbound and outbound courses.

3. The apparatus of claim 2 in which said helical path computing means comprises
   initial altitude means for computing the altitude of said inbound leg at the beginning of said transition path in accordance with said waypoint altitude and the vertical flight path angle of said inbound leg and providing an initial altitude signal in accordance therewith,
   ratio means for providing a ratio signal representative of the ratio of said transition path flown from said beginning thereof to said transition path from said beginning thereof to said bisector, and
   desired altitude means responsive to said initial altitude signal and said ratio signal for providing a desired altitude signal representative of the sum of said initial altitude signal with the product of said ratio signal and the difference between said waypoint and initial altitudes.

4. The apparatus of claim 3 in which said lateral transition path control means includes angular position means for generating an angular position signal representative of the angular position of said aircraft on said transition path with respect to said beginning of said transition path.

5. The apparatus of claim 4 in which said ratio computing means comprises means responsive to said angular position signal for providing said ratio signal representative of the ratio of said angular position of said aircraft to the angular position of said bisector with respect to said beginning of said transition path.

6. The apparatus of claim 4 in which said lateral transition path control means further includes means for generating a circular lateral transition path tangential to said inbound and outbound legs, said circular path having a turn center and a turn radius associated therewith, and
   said angular position means comprises means for generating said angular position signal representative of the angular position of said aircraft on said circular path with respect to said point of tangency thereof on said inbound leg.

7. The apparatus of claim 6 in which
   said initial altitude means comprises means for computing the altitude of said inbound leg at said point of tangency of said circular path on said inbound leg in accordance with said waypoint altitude, said vertical flight path angle of said inbound leg and the arc length on said circular path from said point of tangency to said bisector and providing said initial altitude signal in accordance therewith, and
   said ratio means comprises means for providing said ratio signal representative of the ratio of said circular path flown from said point of tangency to said circular path from said point of tangency to said bisector.

8. The apparatus of claim 7 in which said ratio means comprises means responsive to said angular position signal for providing said ratio signal representative of the ratio of said angular position of said bisector with respect to said point of tangency of said circular path on said inbound leg.

9. The apparatus of claim 7 in which said angular position means comprises means for computing the function $$\beta = \text{TAN}^{-1} \frac{NTCA}{ETCA} - (\phi_1 - 90°),$$

where
$\beta$ = said angular position of said aircraft,
NTCA, ETCA = the north and east coordinates respectively of said aircraft with respect to said turn center of said circular path,
$\psi_1$ = said inbound course.

10. The apparatus of claim 9 in which said ratio means comprises means for computing the function $$\gamma = \frac{\beta}{\frac{\Delta\psi}{2}},$$

where
$\psi_2$ = said outbound course,
$\nu$ = said ratio signal,
$\Delta\psi = \psi_2 - \psi_1$.

11. The apparatus of claim 10 in which said initial altitude means comprises means for computing the function
HI = HW − D TAN $\alpha$,
where
HI = said initial altitude signal,
HW = said waypoint altitude,
D = said arc length on said circular path from said point of tangency to said bisector,
$\alpha$ = said vertical flight path angle.

12. The apparatus of claim 11 in which said desired altitude means comprises means for computing the function HD = HI + $\nu$ (HW − HI), where
HD = said desired altitude signal.

13. The apparatus of claim 3 in which said deviation signal generating means comprises
altimeter means for providing an actual altitude signal representative of the actual altitude of said aircraft, and
combining means responsive to said desired altitude signal and said actual altitude signal for providing an altitude error signal in accordance with the difference therebetween.

14. The apparatus of claim 13 further including an automatic flight control system responsive to said altitude error signal for controlling said aircraft about the pitch axis thereof in response to said altitude error signal.

15. The apparatus of claim 13 further including a flight director system responsive to said altitude error signal and including an attitude director indicator with the vertical steering cue thereof driven by said altitude error signal.

16. The apparatus of claim 13 further including a horizontal situation indicator responsive to said altitude error signal with the glide slope vertical deviation indicator thereof driven by said altitude error signal.

* * * * *